United States Patent [19]

Banker

[11] Patent Number: 5,139,320
[45] Date of Patent: Aug. 18, 1992

[54] TAPE STORAGE DEVICE AND SYSTEM
[75] Inventor: Harold J. Banker, Glassboro, N.J.
[73] Assignee: Ner Holdings, Inc., Stamford, Conn.
[21] Appl. No.: 652,803
[22] Filed: Feb. 7, 1991
[51] Int. Cl.[5] .............................................. A47B 47/02
[52] U.S. Cl. ................... 312/9.53; 312/9.19; 312/245
[58] Field of Search ................... 312/15, 18, 319, 245; 211/46; 206/387

[56] References Cited

U.S. PATENT DOCUMENTS

| 4,046,255 | 9/1977 | Ackeret | 312/319 X |
| 4,050,754 | 9/1977 | Coley | 312/319 |
| 4,678,245 | 7/1987 | Fouassier | 312/15 |
| 4,929,861 | 5/1990 | Metcalf | 312/319 X |

Primary Examiner—Joseph Falk
Attorney, Agent, or Firm—Caesar, Rivise, Bernstein, Cohen & Pokotilow, Ltd.

[57] ABSTRACT

A storage compartment device and system for releasably storing a plurality of tape cartridges therein. The device basically comprises storage compartment means, at least one partitioning means, tape cartridge positioning means and tape cartridge securing means. The storage compartment means comprises a storage compartment having an opening and an interior for removably securing a plurality of tape cartridges therein. The partitioning means of the device partitions the interior of the storage compartment into sections and guides each of the tape cartridges into and out of its respective section. The tape cartridge positioning means is adjacent each of the sections for movably positioning the tape cartridge and to permit independent insertion and retrieval of each of the tape cartridges. In addition, the tape cartridge securing means is located adjacent each of the sections and releasably secures each of the tape cartridges therein. The present invention additionally includes a system comprising the storage compartment device as well as mounting means for releasably mounting a plurality of the storage compartment devices thereon in the desired orientation.

12 Claims, 5 Drawing Sheets

TAPE STORAGE DEVICE AND SYSTEM

FIELD OF THE INVENTION

This invention relates generally to a tape cartridge storage device and system in which a plurality of tape cartridges are compactly stored and easily accessed.

BACKGROUND OF THE INVENTION

In today's business world, computers play a vital role in data compilation, analysis and storage, thereby facilitating data management and business operations. As a result, such entities usually acquire a large number of computer tape cartridges, such as the more commonly known "3480" tape cartridge, thereby permitting safe storage of information on the magnetic tape contained therein.

An important need therefore arises for a tape cartridge storage device and system which compactly stores a plurality of cartridges, yet permits their easy retrieval and return to the storage system. While a wide variety of devices and systems for transporting and storing tape cartridges have been developed, they apparently have suffered from several drawbacks.

For example, in U.S. Pat. No. 4,688,860 (Accumanno et al.) is disclosed a rolling truck for use in transporting tape cartridges to and from a tape cartridge storage system. The truck has four-sided means having a plurality of individual housing units thereon for holding a plurality of tapes. The tape holding means are rotatably mounted so that the operator may readily access the desired tape.

Patents related to the above patent include U.S. Pat. No. 4,815,795 (Accumanno et al.) in which is disclosed a holder for tape cartridges which has an upper and lower section which are divided by partitioned means extending between and integral with the pair of opposite end walls. Further, in related U.S. Pat. No. 4,844,564 (Price, Sr. et al.) is disclosed a storage device having an integrally mounted housing having both an upper and lower section which are formed by partitioned means extending between and integral with the opposing end wall portions. The device further comprises a separate resilient force supplying means secured to the back wall portion of the upper and lower sections for applying a resilient force to the tape cartridge in each of the compartments to urge one portion of the tape cartridge into contact with the lip means and another portion of the tape cartridge into contact with the top wall portion of the partitioned means.

Additional tape storage systems are disclosed in U.S. Design Pat. Nos. 300,287 (Price et al.) and 300,288 (Price et al.).

Other storage systems and carriers for a variety of types of tapes are disclosed in U.S. Pat. Nos. 3,811,745 (Cylke), 3,862,787 (Hilsinger), 4,239,109 (Nielsen et al.), 4,300,809 (Brownlee), and 4,549,775 (Carter).

While these devices have generally been suitable for their intended purposes, many of their designs are complex and therefore inefficient, subject to breakdowns and are expensive to manufacture, transport and install. For example, since some holders utilize a force providing means, such as a spring, which is constantly in contact with the rear of the tape cartridge to bias the cartridge towards the front of the holder, the springs tend to break down after a time period due to constant removal and replacement of tape cartridges, thus requiring repair or replacement of the system.

Additionally, the prior art storage systems which store cartridges directly next to one another, make it difficult to access the individual cartridges with one's fingers. While some storage devices resolve this problem by spacing each tape cartridge far enough apart to permit an operator to grasp it for removal, this results in the inefficient use of storage space which is preferably minimized.

Accordingly, a need exists for a tape storage device to be used to store tape cartridges which overcomes the disadvantages of the prior art.

OBJECTS OF THE INVENTION

Accordingly, it is a general object of this invention to provide a tape storage device and system which overcomes the disadvantages of the prior art.

It is a further object of this invention to provide a tape storage device and system which permits the compact storage of tape cartridges.

It is yet a further object of this invention to provide a tape storage device and system which permits the reliable removal of tapes therefrom and has an extended lifetime.

It is still a further object of this invention to provide a tape storage device and system which permits the easy removal and retrieval of tapes without a concomitant loss in storage space efficiency.

It is yet a further object of this invention to provide a tape storage device and system which are easy and inexpensive to manufacture, install and maintain.

It is another object of this invention to provide a tape storage device and system which is aesthetically pleasing.

It is still a further object of this invention to provide a tape storage device and system which is readily adaptable to the various conditions of use.

SUMMARY OF THE INVENTION

These and other objects of this invention are achieved by providing a storage compartment device and system for releasably storing a plurality of tape cartridges therein. The device basically comprises storage compartment means, at least one partitioning means, tape cartridge positioning means and tape cartridge securing means. The storage compartment means comprises a storage compartment having an opening and an interior for removably securing a plurality of tape cartridges therein. The partitioning means of the device partitions the interior of the storage compartment into sections and sides in guiding each of the tape cartridges into and out of its respective section. The tape cartridge positioning means is adjacent each of the sections to movably position the tape cartridge to permit independent insertion and retrieval of each of the tape cartridges. The tape cartridge securing means is located adjacent each of the sections and releasably secures each of the tape cartridges therein. The present invention additionally includes a system comprising the storage compartment device as well as mounting means for releasably mounting a plurality of the storage compartment devices thereon in the desired orientation.

DESCRIPTION OF THE DRAWINGS

Other objects and may attendant features of this invention will become readily appreciated as the same becomes better understood by reference to the following detailed description when considered in connection with the accompanying drawing wherein.

DETAILED DESCRIPTION OF THE PREFERRED EMBODIMENT

Figure 1:
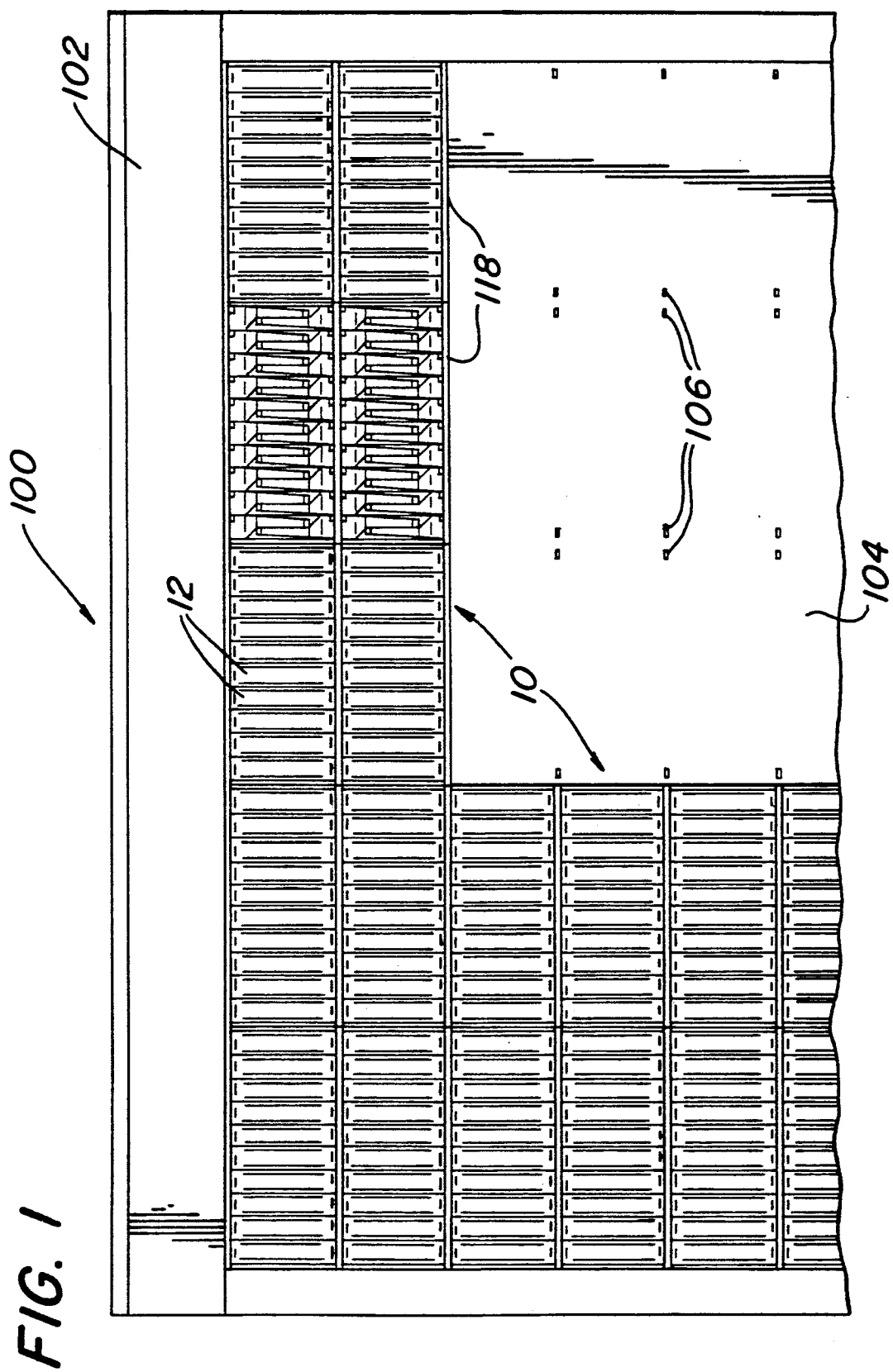
FIG. 1 is a front elevational view of the upper portion of the tape storage system of the present invention with a plurality of storage devices mounted thereon.

Referring now to the various figures of the drawing wherein like reference numerals refer to like parts, there is shown in FIG. 1, a plurality of storage compartment devices 10 embodying the invention mounted with the frame 102 and on the back wall 104 of the storage system 100, all constructed in accordance with this invention.

Figure 2:
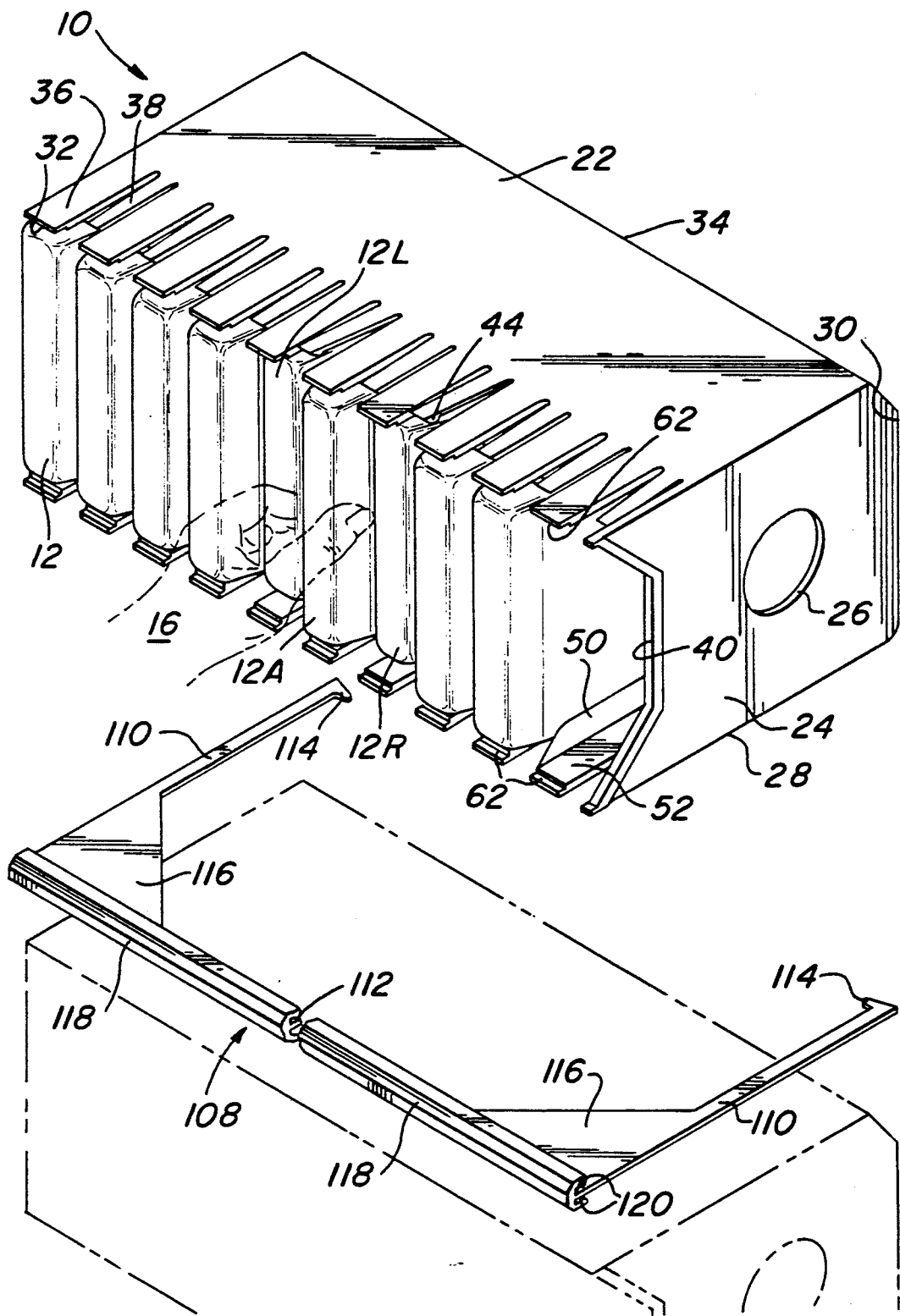
FIG. 2 is an enlarged, exploded isometric view of the storage device of the present invention with an operator's hand in phantom above the U-shaped mounting frame, with an additional storage device shown in phantom therebelow.

As shown more clearly in FIG. 2, the storage compartment device 10 is divided into sections for holding a plurality of tapes 12 which can be easily accessed by a person 16. The tapes shown for use in the present system are commonly referred to as "3480" tape cartridges although it is anticipated that any suitable tape cartridge may be stored within the device by adapting the same to the various sizes.

As seen best in FIG. 2, the storage compartment device 10 is preferably rectangular in shape and comprises integrally formed top wall 22, side walls 24, bottom wall 28 and rear wall 30. The top wall 22 has a longitudinal front edge 32 and longitudinal rear edge 34 extending between the sidewalls 24. Along the front edge 32 and integral therewith are a plurality of flexible cover tabs 36 alternating with a plurality of flexible cartridge locking tabs 38. The flexible cartridge locking tabs 38 have a downwardly extending lip 44 located at the front edge thereof to releasably lock each tape 12 independently in its respective section of the device 10.

Figure 4:
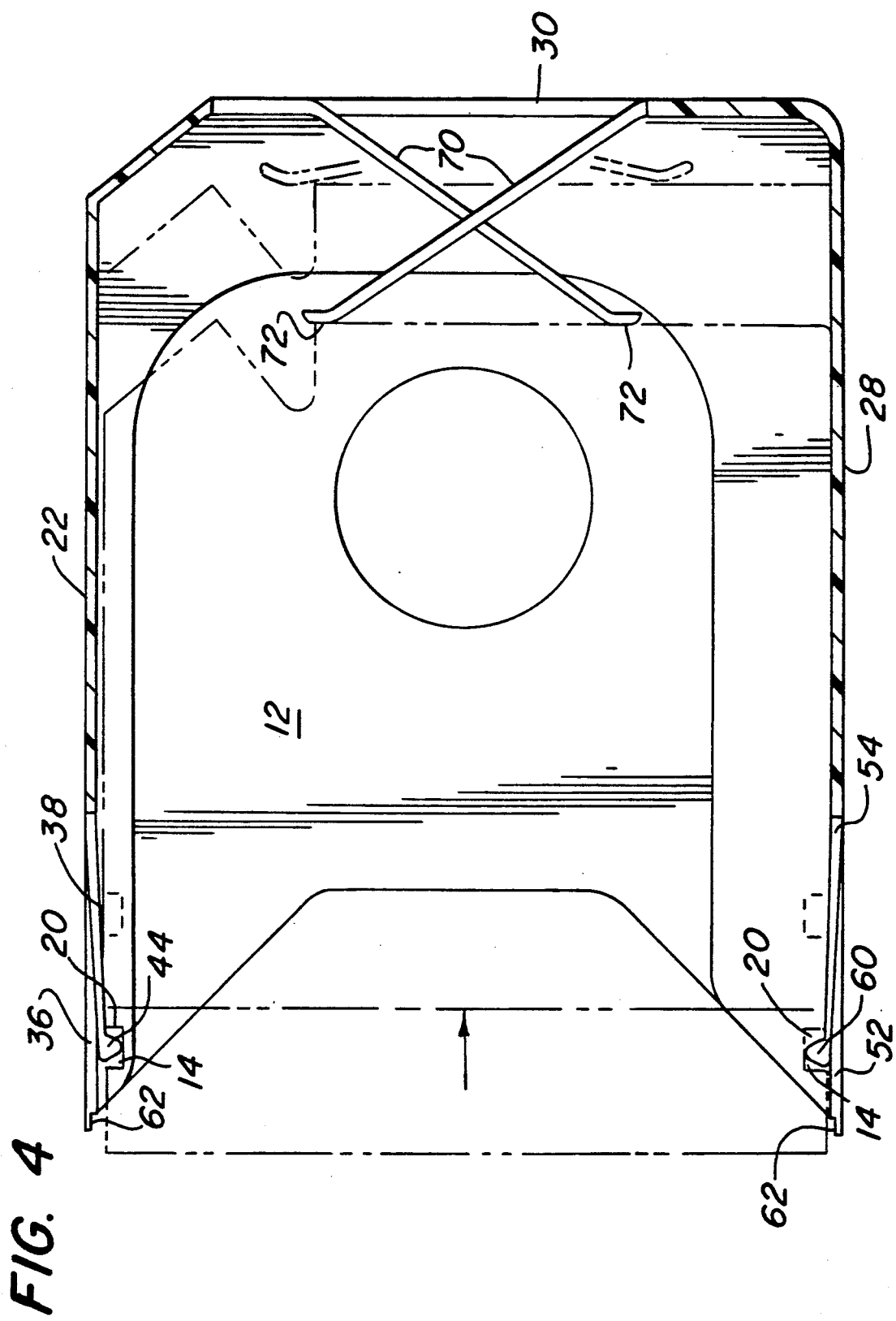
FIG. 4 is an enlarged sectional view, partially in full elevation, of the storage device, taken along line 4—4 of FIG. 3.
Figure 5:
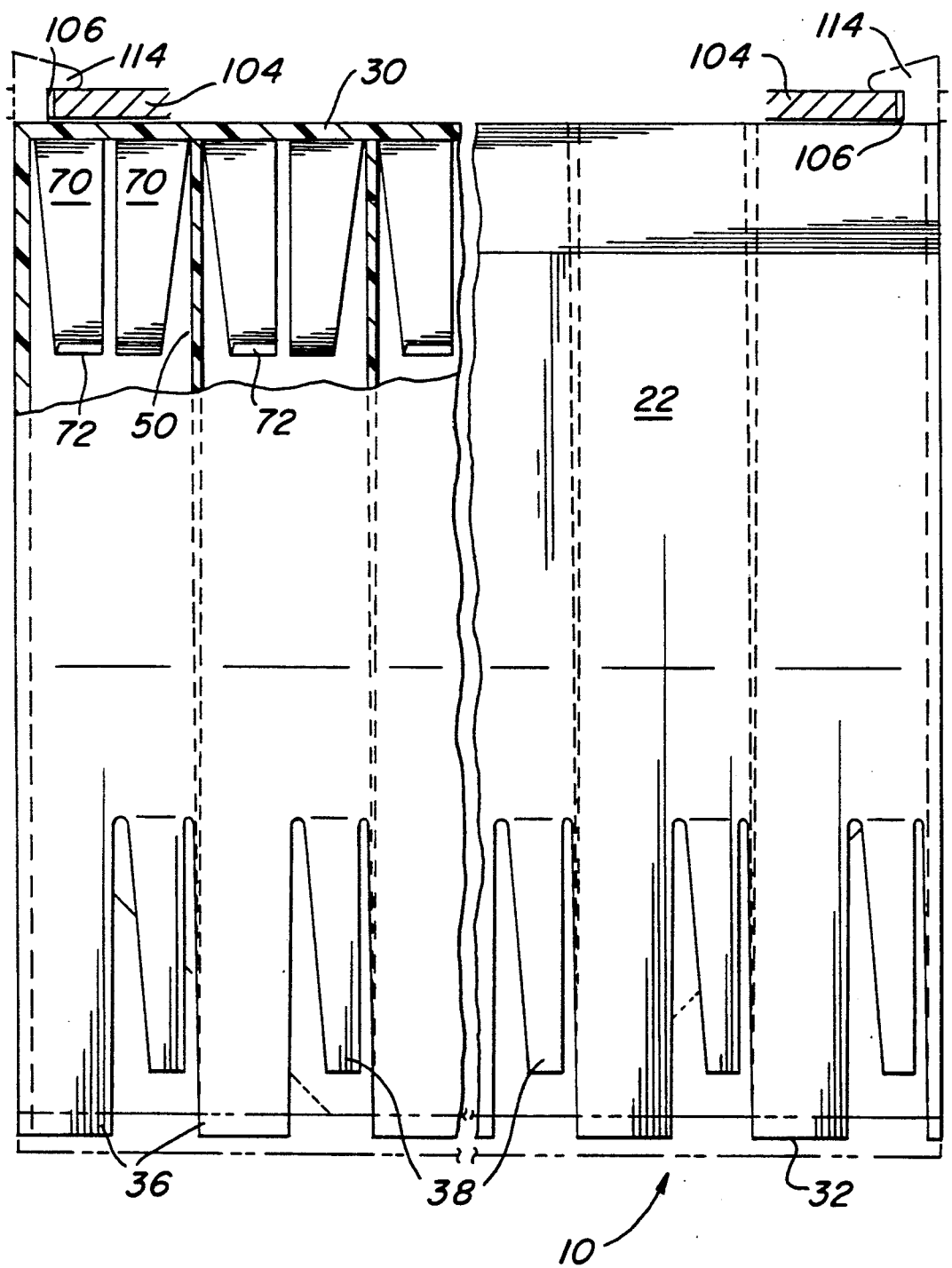
FIG. 5 is an enlarged, top plan view, partially in section, of the storage device of the present invention.

As shown in FIGS. 2, 4 and 5, the bottom wall 28 of the device 10 is constructed in a similar fashion to top wall 22. The bottom wall 28 includes plurality of flexible cartridge locking tabs 54 formed integrally therewith, each of which has an upwardly extending lip 60 located at the end thereof. As in the top wall 22, the cartridge locking tabs 54 alternate with the flexible cover tabs 52. In addition, the cartridge locking tabs of the top wall 22 and of the bottom wall 28, 38 and 54 respectively, are aligned over one another so that each one engages one of the tape recesses 14 on each tape side. The lips 44 and 60, on locking tabs 38 and 54, respectively, aid in releasably securing the tape 12 in the interior of the storage device 10, as shown in FIG. 4. In addition as shown in FIG. 2, flexible cover tabs 36 and 52 have a flange 62 extending horizontally therefrom to releasably engage the lips 120 of the frame 108 of the system 100 which is used to mount the storage device 10 on a wall as described in greater detail below.

As shown in FIG. 2, the storage device 10 additionally includes a plurality of upwardly extending partitioning walls 50. Each wall 50 is secured to one of the plurality of flexible tabs 52 and extends transversely to the front edge to divide the compartment into the desired number of sections. While in the preferred embodiment, the device 10 maximally holds 10 tapes, so that they may be consecutively numbered in groups of ten, it should be appreciated by those skilled in the art that the number of sections that may be created is determined by the number of partitioning walls 50 and the size of the tape cartridges to be stored.

Figure 3:
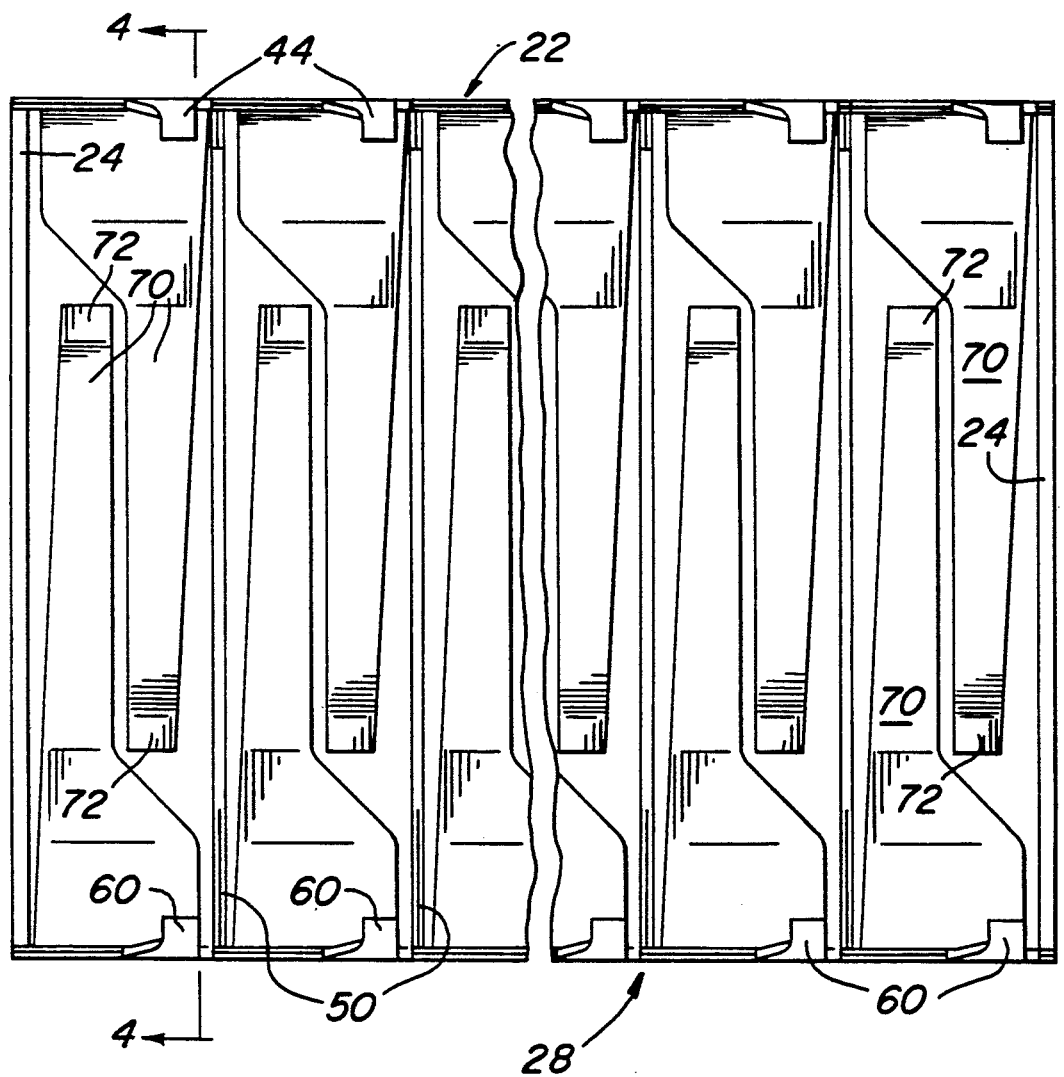
FIG. 3 is an enlarged front elevational view, with a portion broken-away, of a section of the storage device.

As shown in FIG. 2, the tapes 12 are compactly stored with a minimum of space therebetween to reduce often expensive storage space. The storage sections created within the device are therefore only slightly larger than the tape cartridge itself, so as to provide a slidingly snug fit of the cartridge in each section. As shown in FIGS. 3 and 4, a resilient mechanism is therefore provided in each section of the device 10, to assist the user in easily removing tapes. The mechanism comprises the resilient tabs 70 located on the interior surface of the rear wall 30, each of which has a flange or member 72 located at the end thereof.

As seen more clearly in FIG. 4, when each tape 12 is stored in its appropriate section of the device 10, the resilient tabs 70 do not compressively contact the tapes 12, but are in a non-compressed or relaxed state. When one desires to remove a tape 12 as shown in FIG. 2, the person places his/her fingers on either side of the desired tape (e.g., 12A) and presses against the immediately adjacent tape on the left and right thereof, 12L and 12R respectively, thereby displacing the immediately adjacent tapes towards the rear wall 30, causing lips 44 and 60 to ride out of the tape recesses 14 and simultaneously compressing the resilient tabs 70 located behind each respective tape. The compression of tabs 70 displaces the tapes of each side of the desired tape and enables the person to easily grasp the outer end of the desired tape and remove the desired tape 12A by pulling it out of its compartment. Upon removal of the tape, the resilient tabs 70 are decompressed as the person releases the pressure thereon causing the tapes 12L and 12R to be moved to their outwardly stored position with the resilient tabs 70 being returned to their resting, non-compressed state.

When one wishes to place a tape 12 into the device 10 the tape 12 is slid into the desired section and towards the back wall 30. When the tape 12 reaches the resilient tabs 70, and the person releases his/her fingers from the tape, the compression and subsequent decompression of the resilient tabs 70 forces the tape 12 into the locked position as the lips 44 and 60 engage the tape recesses 14.

The storage device 10 described herein is preferably comprised of a one-piece injection molded non-breakable thermo plastic resin with the resilient tabs 70, flexible cover tabs 36, 52 and flexible cartridge locking tabs 38, 54 being integrally molded therein. It should be apparent to those skilled in the art however, that the device may be comprised of any suitable resilient materials.

As shown in FIG. 2, in the preferred embodiment, the device 10 may have an opening 26 in each of sidewalls 24 to permit air to circulate between the tapes 12 during storage and to facilitate ease of handling of the individual storage modules. Further, the front portion of each of the sidewalls 24 is cut out at 40 to provide a recessed edge to enable a person to easily grasp a tape 12 at either end of the device 10.

In addition, as shown in FIGS. 1 and 2, the invention additionally includes a storage system 100 which comprises a plurality of the above-described storage devices 10 which are releasably secured to a mounting wall 104 which is secured to frame 102. The U-shaped frame 108 upon which each device 10 rest is secured to the back wall 104 of the system via the projections 114 extending from the side arms 110 which are removably inserted into openings 106.

The frame 108 additionally has generally triangular resting members 116 integrally connected with the side arms 110 and the front portion 112 upon which the individual storage devices 10 rest. Secured to the front portion 112 of the frame 108 are front engaging members having upper and lower lips 120 for frictionally engaging the horizontal flanges 62 extending from flexible cover tabs 36 and 52 of the storage device 10, depending upon whether the device 10 is secured above or below frame 108. In addition, labels may be secured to the frame 108 on label holders 118.

Thus a new and improved system is shown which is easy to use, has excellent storage capacity and is easily assembled. In addition, the storage devices 10 are dimensioned so that the frontal area maximizes the number of cartridges which can be stored. That is, the interior cross-section of the space for storage of each of the cartridges is only slightly larger than the cross-section of the height and thickness of the cartridge, because the cartridge is moved only in and out of the space and is not moved laterally or up or down.

Without further elaboration the foregoing will so fully illustrate my invention that others may, by applying current or future knowledge, adopt the same for use under various conditions of service.

I claim:

1. A storage system including, in combination, a storage compartment device and a plurality of articles releasably stored therein, wherein the system comprises:
   a. storage compartment means for storing a plurality of articles therein, the storage compartment means comprising a storage compartment having a rear wall, an opening opposite the rear wall and an interior for removably securing the plurality of articles therein;
   b. at least one partitioning means for partitioning the interior of the storage compartment into at least two sections, each of the at least two sections being of substantially the same cross-section as the size of the articles to hold at least each of the plurality of articles therein in a snugly slidable fit;
   c. article positioning means adjacent each of the at least two sections for movably positioning each of the plurality of articles and to permit insertion and retrieval of each of the articles independently from each other from the at least two sections, the positioning means adjacent each section being operable independently of the positioning means adjacent every other section, each article positioning means comprising at least one resilient member having a first end fixedly secured to the rear wall in each of the at least two sections and a second free end extending from the rear wall towards the opening;
   d. article securing means located adjacent each of the at least two sections for releasable securing an article in each of said at least two sections in its respective section in a stored position;
   e. each article in said at least two sections having a rear wall and a region forwardly of said rear wall engaged by the securing means for releasably securing said article in said stored position said each article being dimensioned such that the at least one resilient member in each of said at least two sections is in a generally uncompressed state when said each article is in said stored position.

2. The system of claim 1 wherein each article is a tape cartridge and said region engaged by the securing means located adjacent each of the sections includes a recess in a top wall of said tape cartridge.

3. The device of claim 1 wherein the storage compartment is generally rectangular in shape and additionally comprises, two side walls, a top wall and a bottom wall, each of said walls having an interior and an exterior surface, the partitioning means being located on the interior surface of the bottom wall and additionally comprising a plurality of partitioning walls extending upwardly from the interior surface of the bottom wall towards the interior surface of the top wall.

4. A storage compartment device for releasably storing a plurality of tape cartridges therein, the storage compartment device comprising:
   a. storage compartment means for storing a plurality of tape cartridges therein, the storage compartment means comprising a generally rectangularly shaped storage compartment having an opening, an interior for removably securing the plurality of tape cartridges therein, a rear wall, two side walls, a top wall and a bottom wall, each of the walls having an interior and an exterior surface, said top wall including a rear edge extending between the side walls and being integral with the rear wall;
   b. at least one partitioning means for partitioning the interior of the storage compartment into at least two sections, each of the at least two sections being of substantially the same cross-section as the cartridge size to hold at least each of the plurality of tape cartridges therein in a snugly slidable fit, the partitioning means being located on the interior surface of the bottom wall and additionally comprising a plurality of partitioning walls extending upwardly from the interior surface of the bottom wall towards the interior surface of the top wall;
   c. tape cartridge positioning means adjacent each of the at least two sections for movably positioning each of the plurality of tape cartridges and to permit insertion and retrieval of each of the tape cartridges independently form each other from the at least two sections, wherein the tape cartridge positioning means comprises at least one resilient member, and
   d. tape cartridge securing means integrally formed as part of the top wall and being located adjacent each of the sections for releasably securing each of the tape cartridges in its respective section, the tape cartridge securing means comprising:
      a plurality of flexible cover tabs each formed integrally with the top wall and extending in a forward direction from a rear end located forwardly of the rear edge of the top wall to a free, forward edge of said top wall, each of the plurality of flexible cover tabs having a flange extending horizontally therefrom; and
      a plurality of flexible cartridge locking tabs formed integrally with the top wall and extending in a forward direction from a rear end located forwardly of the rear edge of the top wall to a free, forward edge of said top wall, each of the plurality of flexible cartridge locking tabs additionally comprising a tape cartridge engaging means disposed inwardly toward the interior surface at the bottom wall for releasably engaging the tape cartridge while in the interior of the storage compartment.

5. The device of claim 4 wherein the flexible cartridge locking tabs additionally comprise a front edge and a rear edge, the rear edge being integrally formed with the top wall, the tape cartridge engaging means additionally comprising a downwardly extending lip means for engaging a recess in a tape cartridge.

6. The device of claim 5 wherein the lip means comprises a lip integral with each of the front edges of the flexible cartridge locking tabs.

7. The device of claim 1 wherein the resilient member of the tape cartridge positioning means is fixedly secured to the interior surface of the back wall of each section of the storage compartment and comprises at least one resilient tab having at least one flange at the end thereof, the at least one resilient tab extending angularly from the back wall towards the opening of the storage compartment.

8. A storage compartment device for releasably storing a plurality of tape cartridges therein, the storage compartment device comprising:
   a. storage compartment means for storing a plurality of tape cartridges therein, the storage compartment means comprising a generally rectangularly shaped storage compartment having an opening, an interior for removably securing the plurality of tape cartridges therein, a rear wall, two side walls, a top wall and a bottom wall, each of the walls having an interior and an exterior surface, said bottom wall including a rear edge extending between the sidewalls and being integral with the rear wall;
   b. at least one partitioning means for partitioning the interior of the storage compartment into at least two sections, each of the at least two sections being of substantially the same cross-section as the cartridge size to hold at least each of the plurality of tape cartridges therein in a snugly slidable fit, the partitioning means being located on the interior surface of the bottom wall and additionally comprising a plurality of partitioning walls extending upwardly from the interior surface of the bottom wall towards the interior surface of the top wall;
   c. tape cartridge positioning means adjacent each of the at least two sections for movably positioning each of the plurality of tape cartridges and to permit insertion and retrieval of each of the tape cartridges independently from each other from the at least two sections, wherein the tape cartridges positioning means comprises at least one resilient member, and
   d. tape cartridge securing means integrally formed as part of the bottom wall and being located adjacent each of the sections for releasably securing each of the tape cartridges in its respective section, the tape cartridge securing means comprising:
      a plurality of flexible cover tabs formed integrally with the bottom wall and extending in a forward direction from a rear end located forwardly of the rear edge of the bottom wall to a free forward edge of said bottom wall; and
      a plurality of flexible cartridge locking tabs formed integrally with the bottom wall and extending in a forward direction from a rear end located forwardly of the rear edge of the bottom wall to a free forward edge of said bottom wall, each of the plurality flexible cartridge locking tabs additionally comprising a tape cartridge engaging means disposed inwardly toward the interior surface of the top wall for releasably engaging the tape cartridge while in the interior of the storage compartment.

9. A storage system for releasably storing a plurality of tape cartridges therein, the system comprising:
   a. mounting means for releasably mounting at least one storage compartment means, wherein the mounting means comprises a generally U-shaped frame for releasably supporting the at least one storage compartment means thereon;
   b. storage compartment means for storing a plurality of tape cartridges therein, the storage compartment means comprising a storage compartment having an opening and an interior for removably securing the plurality of tape cartridges therein;
   c. at least one partitioning means for partitioning the interior of the storage compartment into at least two sections, each of the at least two sections being of substantially the same cross-section as the tape cartridge to hold at least one each of the plurality of tape cartridges therein in a snugly slidable fit; and
   d. tape cartridge positioning means adjacent each of the at least two sections for movably positioning each of the plurality of tape cartridges and to permit insertion and retrieval of each of the tape cartridges independently from each other from the at least two sections, where in the tape cartridge positioning means comprises at least one resilient member.

10. The system of claim 9 additionally comprising tape cartridge securing means located adjacent each of the sections for releasably securing each of the tape cartridges in its respective section.

11. The system of claim 9 wherein the mounting means additionally comprises a generally vertical mounting surface to releasably engage the generally U-shaped frame.

12. A storage system including, in combination, a storage compartment device and a plurality of tape cartridges therein, the system comprising:
   a. storage compartment means for storing a plurality of tape cartridges therein, the storage compartment means comprising a storage compartment having a rear wall, an opening opposite the rear wall and an interior for removably securing the plurality of tape cartridges therein;
   b. at least one partitioning means for partitioning the interior of the storage compartment into at least two sections, each of the at least two sections having substantially the same height as the height of the cartridge to hold at least each of the plurality of tape cartridges therein in a snugly slidable fit;
   c. separate and independently operable tape cartridge positioning means adjacent each of the at least two sections for independently movably positioning each of the plurality of tape cartridges and to permit insertion and retrieval of each of the tape cartridges independently from each other form the at least two sections, wherein the tape cartridge positioning means comprises at least one resilient member having a first end fixedly secured to the rear wall in each of the at least two sections and a second free end extending from the rear wall towards the opening;

d. tape cartridge securing means located adjacent each of the at least two sections for releasably securing each of the tape cartridges in its respective section in a stored position; and e. each tape cartridge in said at least two sections having a rear wall and a region forwardly of said rear wall engaged by the securing means for releasably securing said each tape cartridge in said stored position, said each tape cartridge being dimensioned such that the at least one resilient member in each of said at least two sections is in a generally uncompressed state when a tape cartridge is in said stored position.

* * * * *